3,156,629
PROCESS FOR THE PRODUCTION OF A HIGHLY PURIFIED ALCOHOL
Wilhelm Ester, Herne, Germany, assignor to Bergwerksgesellschaft Hibernia A.G., Herne, Germany, a German corporation
Filed Oct. 5, 1960, Ser. No. 62,072
Claims priority, application Germany Feb. 17, 1958
6 Claims. (Cl. 202—57)

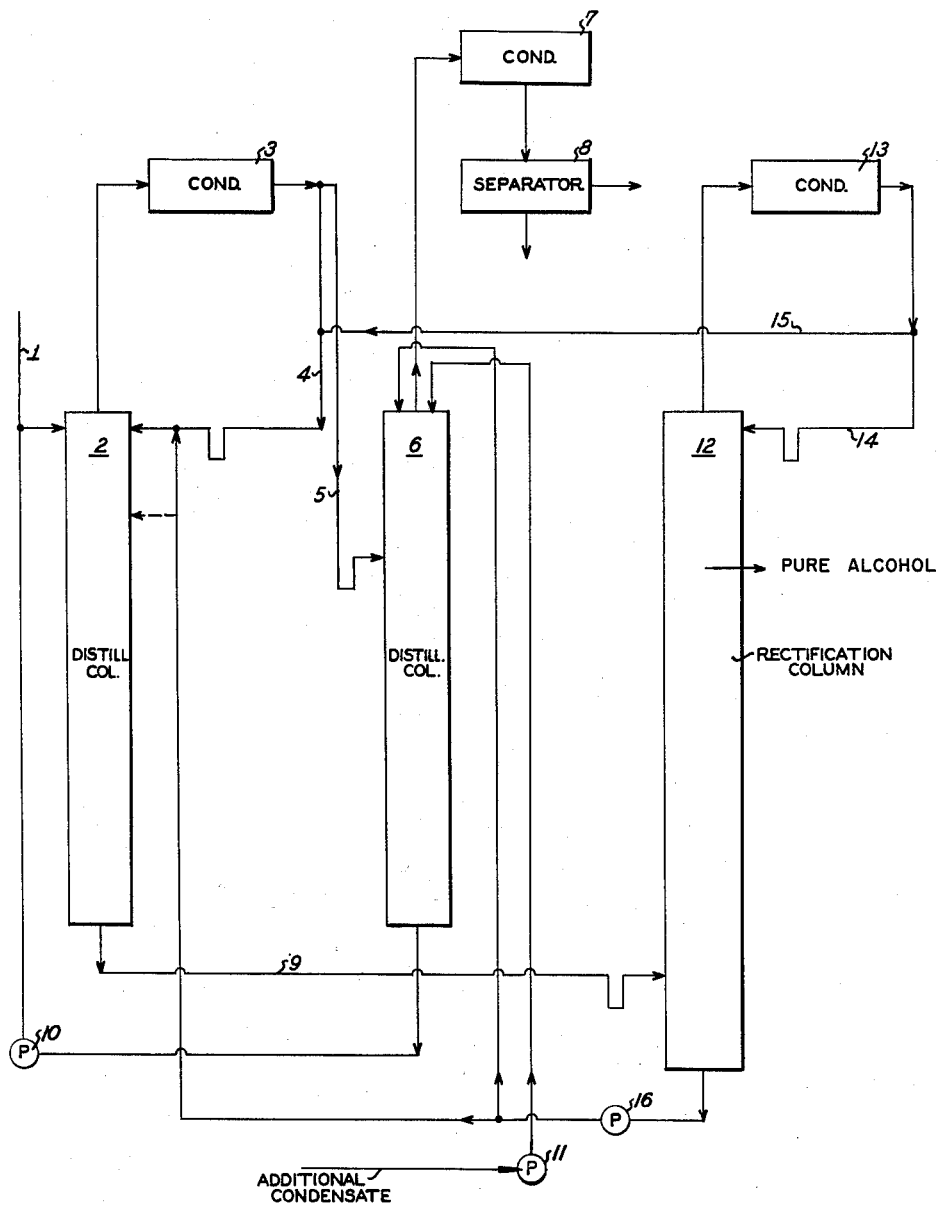

This invention relates to the production of a highly purified alcohol, and more particularly to the efficient purification of crude alcohols resulting from synthesis methods. The application is a continuation-in-part of application Serial No. 793,628, filed February 16, 1959, now abandoned.

Crude alcohols obtained by various conventional processes are naturally contaminated with a number of impurities. The removal of these contaminants, heretofore, has always involved considerable difficulties. Generally, purification of crude alcohols is effected in tower apparatus wherein the alcohol-containing reaction mixture is introduced at the upper portion of the tower while steam which is necessary for the removal of the impurities is simultaneously introduced into the lower portion of the tower. The impurities upon extraction by the steam are carried off therewith at the top of the tower, while the purified alcohol is conducted to a rectification zone for final cleaning. The impurities drawn off with the steam, nevertheless, still contain considerable quantities of alcohol, but further separation therefrom is very difficult. Accordingly, this method of purifying crude alcohol is inefficient and considerable amounts of the product so obtained consist of inferior alcohols.

In particular, in the conventional purification of crude alcohol produced by catalytic alcoholation of ethylene, the reaction mixture is classified according to pH-value by the addition of alkali materials having a pH between about 6 and 9. Upon distilling the various fractions, the ethanol solution obtained may be contacted with a nickel catalyst and once more recovered by fractional distillation. This purification method, unfortunately, is both cumbersome and expensive.

It has also been proposed to effect the alcohol purification by column operations wherein the crude alcohol mixture is fed to the middle part of a column while steam necessary for the extraction of the impurities is fed to the lower part of the column. Pure water or a dilute alcoholic aqueous solution is fed to the upper part of the column and is allowed to trickle downwardly therethrough. The rate is controlled so that the alcohol concentration in the column does not exceed 20%. At the top of the column the water vapors containing the impurities in concentrated form are drawn off, condensed, and then returned to the bottom of the column. However, a partial quantity of the condensate is constantly removed corresponding in amount to the impurities contained in the starting liquid being constantly added. In the upper part of the column a zone of very concentrated impurities is thereby formed.

Additionally, this purification process may be improved by providing a trough or decanting means in the head of the column in order to obtain a separation of the liquid therein accumulated into an upper layer rich in impurities which can be readily drawn off and a lower layer. The yield of pure alcohol obtainable in view of this improvement is said to be almost theoretical.

Actually, however, this method is unsuitable for the purification of highly contaminated synthetically produced alcohols, since the reaction products of the synthesis contain particularly large amounts of ethers and aldehydes, which cannot be effectively and sufficiently separated by such decanting means into the various components. Furthermore, in order to avoid corrosion and to increase purification of the mixture, it is desirable to combine the alkali and washing water recycled from the lower part of a subsequent column in the apparatus back to the head of the instant column.

Nevertheless, in these various column methods, resinous products are often formed from the aldehyde content in the crude alcohol which partially settle in the form of incrustations on the column bottom. This leads to an impairment of the effectiveness of the column. Such incrustations are particularly in evidence where the ethylene starting product has not first been subjected to a separate hydrogenation step before the main alcohol synthesis. Since any unhydrogenated acetylene contained in the ethylene used is for the most part converted into aldehyde, very strong incrustations and resin deposits may be formed which render impossible dependable column operation. In addition, it is necessary to interrupt the process from time to time in order to clean the columns and to undertake cumbersome and costly purification measures as well.

It is significant, furthermore, that crude alcohol present in low concentration cannot be directly and readily purified by conventional methods. Ordinarily, for purification, the concentration of the alcohol in the reaction liquid must be 60% or more. If the concentration is lower, special means must be preliminarily employed in order to first obtain the necessary increase in concentration.

It is therefore an object of the invention to overcome the above-described drawbacks of conventional processes and to provide a process and apparatus for the efficient and inexpensive purification of alcohols, especially those produced by conventional methods of synthesis.

Other and further objects will become apparent from a study of the within specification and accompanying drawings in which:

FIG. 1 is a diagrammatic flow scheme of tower apparatus for carrying out the process of the invention.

It has now been found in accordance with the invention that highly purified alcohols may be recovered in very high yields, i.e., almost theoretical up to (99.8%), from alcohol synthesis reaction products even though the alcohol content is low and the reaction product contains many impurities.

Thus, for example, alcohol reaction products obtained by the catalytic alcoholation of ethylene, employing phosphoric acid catalysts, possibly in conjunction with porous carrier materials, may be purified in accordance with the invention despite the fact that the alcohol is only present in a concentration of, for example, about 10 to 15% and the alcohol is contaminated with considerable quantities of side products. Normally, such side products include aldehydes such as acetaldehyde, crotonaldehyde and sorbinaldehyde, as well as acids, higher alcohols, ethers, esters, such as ethylacetate, aliphatic and/or olefinic hydrocarbons containing from 3–6 C-atoms and the like.

In accordance with the method of the invention, the separation of these impurities is effected by feeding the crude alcohol as it is produced in the synthesis, without prior increase in concentration, not to the middle of the first column but rather to a point in the upper part of the first washing column. Water, such as that freed of alcohol by distillation and drawn from the bottom of a subsequent rectification column, to which alkali is preferably added to produce a pH value of about 8 to 12, is introduced at a point in the upper part of the first column either at about the same level of the column as that at which the raw alcohol is introduced or which is just at a point in the upper part of the first column below the entrance point of the crude product. Part or all of the condensate obtained upon condensation of the vapors withdrawn from the top of the first column and containing impurities carried off therewith may be conducted to a second, smaller washing column for further separation of any entrained alcohol from the impurities while a portion of the residual condensate may be recycled to the first washing column.

Thus, in accordance with the process of the invention alcohols of high purity may be obtained in extraordinarily high yields without the formation of resins. Advantageously, the washing with the aqueous alkaline solution may be carried out in a zone of the column which is essentially free from resin-forming impurities, since these impurities are collected in concentrated form in the upper zone of the column and are drawn off in vapor form therefrom. As a consequence of the great dilution of the crude alcohol fed to the head of the column, the impurities are only present in the initial crude alcohol and not in the recycled liquids.

Introduction of the crude alcohol and alkaline wash water, both at the same level of the column, has the particular advantage that higher hydrocarbons as, for example, certain low molecular weight liquid polyethylenes and higher alcohols, such as tertiary butyl alcohol, are removed almost quantitatively from the top of the first column as first runnings and thus a considerably purer alcohol is fed from the sump of the washing column into the rectifying column than if the crude product were introduced at a point in the middle of the first column.

In accordance with another embodiment of the invention in which columns constructed of copper or other corrosion-resistant materials are used, the crude alcohol can be purified by distillation by adjusting the pH of the crude alcohol to less than 8 and possibly less than 7. Therefore, the possibility exists of carrying out the distillation in the acid state without the addition of any alkaline solution whatsoever which represents a particular advantage. It has surprisingly been found in this connection that when the permanganate test is carried out on the finished alcohol, the results completely correspond, even when no alkaline agent has been added to the quality specifications as established for pure alcohols, thus proving that even the higher, and in particular the unsaturated aldehydes, were practically completely removed by the distillation. Furthermore, it has been found that the fusel-oil reaction with salicylaldehyde gives substantially better values than when the alcohol is distilled by the previously known methods.

In order to separate the quantities of alcohol which may still be present in the vapors drawn off at the head of the first column, a second essentially smaller washing column is employed. This second column is constructed as a container column, and the condensate obtained from the vapors containing the impurities and entrained alcohol are merely fed thereto. A part of the condensate may be recycled to the first column instead. In this manner, the yield of pure alcohol obtained is substantially increased over that obtainable by hitherto employed conventional processes.

The addition of alkali to the wash water suitably takes place after the distilled water has been drawn off from the rectification column but before it has entered the washing column. It is also possible to feed the alkali directly to the rectification column above the entrance of the diluted alcohol. In this way, the wash water to be added to the washing column is assured of having a pH between about 8 and 12.

Among the alkaline addition materials which may be used in accordance with the invention are aqueous or alcohol solutions of alkali hydroxides and carbonates and alkali earth hydroxides and carbonates. Preferably, sodium and potassium hydroxides may be used.

When carrying out the process of the invention according to the embodiment in which the wash water and crude alcohol are both introduced at the same level of the column, it is advantageous to introduce both into the top tray of the column.

The accompanying drawing illustrates one form of apparatus for carrying out the process of the invention.

At the bottom of column 2, the accumulated liquid containing about 4 to 12% alcohol and alkali is drawn off through conduit 9 and fed to rectification column 12. The distilled water recovered from the bottom of column 12 is preferably recycled after the addition of sufficient alkali to assure a pH value of from about 8 to 12, through the conduit equipped with pump 16 into column 2, where it is fed at a temperature of preferably about 95 degrees to 100 degrees C. to a trough located below the entrance point of the crude alcohol. Likewise, the alcohol and alkali liquid taken from the bottom of column 6 is also recycled through the conduit equipped with pump 10 into column 2 at about the same level.

The vapors drawn off from column 6 are conducted to the cooler 7, whereby the impurities yielded upon condensation are separated in the separator 8 into the various components. From rectification column 12 through a conduit the pure alcohol is drawn off in yields of, e.g., 99.8%, while the vapors drawn off at the head of column 12 are, after condensation in cooler 13, recycled once more partially through conduit 14 to the head of column 12 and/or through conduit 15 to column 2.

Into the head of column 6 through the conduit equipped with pump 11, additional condensate may be fed, if desired. Likewise, second washing column 6 may be fed recycled distilled water and alkali through conduit 17.

It will be understood that besides alcohols obtained by the catalytic alcoholation of ethylene in the presence of phosphoric acid as catalyst, various other solutions of alcohols containing similar impurities in large quantities, such as those obtained in the synthesis of alcohols from ethylene in the presence of other catalysts such as tungsten oxide, titanium dioxide, and the like, or those obtained by the fermentation of synthetic or natural materials, may be treated in accordance with the process of the invention to obtain good yields of alcohol in high purity.

The process of the invention is particularly suitable for alcohols obtained by the catalytic alcoholation of ethylenes in the presence of phosphoric acid as catalyst, since it is not necessary to hydrogenate any acetylenes present in the starting materials prior to the main alcohol synthesis reaction.

The temperatures of the aqueous alkali solution which is to be introduced at the first column (95–100 degrees C.) may be lowered to a minimum temperature of about 80 degrees C., particularly if the process is carried out at normal pressure. The upper limit is a temperature of almost 100 degrees C., so that the temperature substantially approaches but does not exceed the boiling temperature. Since it is possible to carry out the process at slightly raised pressures, ranging from normal pressure to about 10 atmospheres, the temperature range in this case may be raised correspondingly.

The water which may be added to the second column 6 is advantageously drawn off at the bottom of column 12 through the conduit equipped with pump 16. It is also possible to use as the water for the washing, water drawn from the bottom of another rectification column provided that it is substantially alcohol free, such water being introduced into column 6 by means of a conduit communicating with column 6 and equipped with pump 11.

The condensate obtained upon condensation of the vapors withdrawn from the top of the first column 2 may be recycled partially to the first column 2 while a portion of the residual condensate may be conducted to the second column 6. The quantity of the latter is so measured that it corresponds nearly to the quantity of contaminations contained in the crude alcohol introduced through conduit 1 in column 2. The recycled condensate contains the major part of the contaminators, i.e., aldehydes, ketones, ethers, acids, esters, aliphatic and/or olefinic hydrocarbons containing from 3–6 C-atoms, and causes a further enrichment of contaminations in the upper part of column 2. The recycled quantities depend on the quantities of contaminations of the crude alcohol. Generally the proportion of the quantities of recycled condensate introduced to the second column to the quantities recycled to the first column comprises the range of 1:1 to 1:20.

*Example I*

10 m.³ per hour of a 15% alcohol solution, obtained by catalytic alcoholation of ethylene in the presence of phosphoric acid as catalyst, are passed through conduit 1 in column 2. The alcoholic part of this solution contains the following contaminants:

1% aldehydes.
1–2% ethers.
A maximum content of 1% of other impurities such as ketones, hydrocarbons, acids, esters and the like.

Water is added at quanties which correspond to about 0.2 to 1.5 times the quantities of alcohol contained in the crude mixture, so that the solution withdrawn from the bottom of column 2 contains about 7 to 12% alcohol. This water (containing alkali; pH 10; temperature 98 degrees C.) is water which has been withdrawn from the bottom of column 12 and is introduced in column 2 at a point which lies one or more plates below the entrance point of the crude alcohol solution. 500 kg. steam per hour are introduced at the lower part of column 2. The impurities are accumulated in the upper part of column 2 and are passed in vapor form to recycling condenser 3. 20 parts of the condensate are recycled to column 2 (through conduit 4) while 1 part is passed through conduit 5 to column 6. This liquid is composed of about 50% ether and other impurities, 30% alcohol and 20% water. Aqueous alkali solution drawn off at the bottom of column 12 is passed through conduit 17 to the head of column 6 in such quantities that the product drawn off from the head of column 6 and condensed in condenser 7 is composed of about 5% alcohol (=81. per hour), 70% water (=112 l. per hour), 25% ether, acetaldehyde and the other impurities (=40 l. per hour). The liquid withdrawn from the bottom of column 6 (containing about 4% alcohol and traces of other impurities) is introduced in column 2 at a point below the entrance of the crude alcohol mixture. Alcohol solution of 7–8% is drawn off at the bottom of column 2 and is passed through conduit 9 to rectification column 12. In a column, consisting of, for example, 70 plates, introduction may take place at the 14th plate; withdrawal of the purified alcohol of 94% (yield: 99.5%) may take place at the 56th–60th plates. The obtained purified product may be brought to higher concentrations by one of the known processes. An aqueous solution of sodium hydroxide is added dropwise, e.g., at the 33rd plate in quantities necessary to obtain a pH of about 10. These quantities are very small, since the alcohol coming from column 2 contains alkali and only traces of aldehydes. Part of the vapors drawn off at the head of column 12 are recycled (e.g., at a reflux proportion of 1:4). The condensate which is withdrawn is passed through conduits 15 and 4 to the head of column 2, in order to eliminate residual impurities which may be contained in column 12.

*Example II*

10 m.³ per hour of an approximately 15% alcoholic solution which was obtained in the catalytic alcoholation of ethylene in the presence of phosphoric acid as catalyst are fed through conduit 1 into the column 2. The alcoholic content of the solution has the following composition:

1% aldehydes.
1–2% ethers.
A maximum content of 1% of other impurities, such as ketones, hydrocarbons, acids, esters, etc.

Water is added in amounts which corresponds to 0.2 to 3.5 times the amounts contained in the crude alcohol mixture so that the solution withdrawn at the bottom of the column 2, contains about 7–12% alcohol. This alkali-containing water having a pH of 10 and a temperature of 98 degrees C. and which comes from the bottom of column 12 is fed into column 2 at the same point as the crude alcohol. 500 kg. of steam are fed per hour to the lower part of the column 2. The impurities are collected in the upper part of the column 2 and pass in vapor form to the recycling condenser 3. 20 parts of the condensate are returned via conduit 4 into the column 2, while 1 part passes through line 5 and is introduced into the column 6. The liquid is composed of:

50% ether.
Other impurities, 20–25% alcohol and 25–30% water.

The alkali solution withdrawn from the bottom of the column 12 passes via conduit 17 to the top of the column 6 in such an amount that the product withdrawn at the top of column 6 and condensed in the condenser 7 contains about 5% alcohol (8 liters per hour), 70% water (112 liters per hour), 25% ether, acetaldehyde and other impurities (40 liters per hour). The liquid withdrawn at the bottom of column 6 and which contains about 4% alcohol and traces of other impurities, is charged at the top of column 2 at the same point as the crude alcohol. The alcoholic solution having a concentration of 7–8% is withdrawn from the bottom of column 2 and passes via line 9 to the rectifying column 12. In case of a column having for instance 70 plates, introduction may take place at the 14th plate; the withdrawal of the pure alcohol having a concentration of 94% (yield 99.5%) can be effected for instance at the 56–60th plates. The purified product obtained can be brought to a higher concentration by one of the known methods. An aqueous solution of sodium hydroxide is for instance added at the 33rd plate in the amount required to obtain a pH of about 10. The amounts to be added are very small since the alcohol as it comes from column 2 contains alkali and only small traces of aldehydes.

A part of the vapor withdrawn from the top of column 12 is recycled (recycle ratio for instance 1:4). The recycled condensate passes via lines 15 and 4 to the top of column 2 in order to remove the remaining impurities which are still contained in column 12.

What is claimed is:

1. A process for the purification of crude alcohol mixtures present in solution in concentration of about 10–15% and containing impurities prepared by a phosphoric acid catalyzed alcoholation of ethylene by alkali treatment, distillation and rectification thereof comprising introducing the crude alcohol mixture into the uppermost portion of a first distillation zone, introducing an aqueous alkaline solution having a pH within the range of 8 to 12 at a temperature of from about 80 to 100° C. but below the boiling point thereof into said uppermost portion of said first distillation zone at a point below the introduction of the crude alcohol mixture, withdrawing overhead from said first distillation zone a vaporous mixture containing impurities with some entrained alcohol, condensing said vaporous mixture and introducing at least a portion of the condensed vapors into the upper portion of a second distillation zone, introducing an aqueous alkaline solution at a temperature of about 80 to 100° C. but below the boiling point thereof into the upper portion of said second distillation zone at a point somewhat above that of the introduction of the condensed vapors, withdrawing overhead from said second distillation zone a vaporous mixture substantially free of alcohol, withdrawing from the bottom portion of said second distillation zone an aqueous alcohol solution for introducing into said uppermost portion of said first distillation zone with said crude alcohol, withdrawing from the bottom portion of said first distillation zone an aqueous alcohol solution, introducing said aqueous alcohol solution from said first distillation zone into a lower intermediate portion of a rectification zone and withdrawing from the upper portion of said rectification zone a substantially pure alcohol fraction.

2. A process according to claim 1 wherein substantially pure water is withdrawn from the bottommost portion of said rectification zone and at least a portion of said water is introduced into said first distillation zone after addition thereto of an alkaline agent.

3. A process according to claim 1, wherein substantially pure water is withdrawn from the bottom-most portion of said rectification zone and at least a portion of said water is introduced into said second distillation zone after addition thereto of an alkaline agent.

4. A process according to claim 1 wherein said aqueous alkaline solution has a pH within the range of about 8 to 12.

5. A process for the purification of crude alcohol mixtures present in solution in concentration of about 10–15% and containing impurities prepared by a phosphoric acid catalyzed alcoholation of ethylene by alkali treatment, distillation and rectification thereof comprising introducing the crude alcohol mixture into the uppermost portion of a first distillation zone, introducing an aqueous alkaline solution having a pH within the range of 8 to 12 at a temperature of from about 80 to 100° C. below the boiling point thereof into said uppermost portion of said first distillation zone at about the same level as the introduction of the crude alcohol mixture, withdrawing overhead from said first distillation zone a vaporous mixture containing impurities with some entrained alcohol, condensing said vaporous mixture and introducing at least a portion of the condensed vapors into the upper portion of a second distillation zone, introducing an aqueous alkaline solution at a temperature of about 80 to 100° C. but below the boiling point thereof into the upper portion of said second distillation zone at a point somewhat above that of the introduction of the condensed vapors, withdrawing overhead from said second distillation zone a vaporous mixture substantially free of alcohol, withdrawing from the bottom portion of said second distillation zone an aqueous alcohol solution for introducing into said uppermost portion of said first distillation zone with said crude alcohol, withdrawing from the bottom portion of said first distillation zone an aqueous alcohol solution, introducing said aqueous alcohol solution from said first distillation zone into a lower intermediate portion of a rectification zone and withdrawing from the upper portion of said rectification zone a substantially pure alcohol fraction.

6. A process for the purification of crude alcohol mixtures present in solution in a concentration of about 10–15% and containing impurities prepared by a phosphoric acid catalyzed alcoholation of ethylene by alkali treatment, distillation and rectification thereof comprising introducing the crude alcohol mixture after adjusting the pH thereof to a value of about 7 into the uppermost portion of a first distillation zone, introducing water at a temperature above 80° C. but less than 100° C. into said uppermost portion of said first distillation zone at about the same level as the introduction of the crude alcohol mixture, withdrawing overhead from said first distillation zone a vaporous mixture containing impurities with some entrained alcohol, condensing said vaporous mixture and introducing at least a portion of condensed vapors into the upper portion of a second distillation zone, introducing an aqueous alkaline solution at a temperature of about 80 to 100° C. but below the boiling point thereof into the upper portion of said second distillation zone at a point somewhat above that of the introduction of the condensed vapors, withdrawing overhead from said second distillation zone a vaporous mixture substantially free of alcohol, withdrawing from the bottom portion of said second distillation zone an aqueous alcohol solution for introducing into said uppermost portion of said first distillation zone with said crude alcohol, withdrawing from the bottom portion of said first distillation zone an aqueous alcohol solution, introducing said aqueous alcohol solution from said first distillation zone into a lower intermediate portion of a rectification zone and withdrawing from the upper portion of said rectification zone a substantially pure alcohol fraction.

References Cited in the file of this patent

UNITED STATES PATENTS

| | | |
|---|---|---|
| 2,080,111 | Bump | May 11, 1937 |
| 2,555,185 | Cromeans | May 29, 1951 |
| 2,636,847 | Hamner et al. | Apr. 28, 1953 |
| 2,666,735 | Morrell et al. | Jan. 19, 1954 |
| 2,696,463 | Baevsky | Dec. 7, 1954 |
| 2,891,895 | Stewart et al. | June 23, 1959 |
| 2,993,840 | Poincet | July 25, 1961 |

FOREIGN PATENTS

| | | |
|---|---|---|
| 555,145 | Belgium | Mar. 15, 1957 |